(12) United States Patent
Katahira

(10) Patent No.: US 8,902,444 B2
(45) Date of Patent: Dec. 2, 2014

(54) IMAGE PROCESSING APPARATUS AND METHOD, INCLUDING USER AUTHENTICATION, AND STORAGE MEDIUM

(75) Inventor: Yoshiaki Katahira, Yokohama (JP)

(73) Assignee: Canon Kabushiki Kaisha (JP)

( * ) Notice: Subject to any disclaimer, the term of this patent is extended or adjusted under 35 U.S.C. 154(b) by 258 days.

(21) Appl. No.: 12/760,945

(22) Filed: Apr. 15, 2010

(65) Prior Publication Data

US 2010/0265532 A1 Oct. 21, 2010

(30) Foreign Application Priority Data

Apr. 15, 2009 (JP) ................................ 2009-099028

(51) Int. Cl.
*G06K 15/00* (2006.01)
*H04N 1/44* (2006.01)
*G06F 21/31* (2013.01)
*H04N 1/00* (2006.01)

(52) U.S. Cl.
CPC ............ *H04N 1/0035* (2013.01); *H04N 1/4426* (2013.01); *H04N 1/444* (2013.01); *G06F 21/31* (2013.01); *H04N 1/00514* (2013.01); *H04N 1/4406* (2013.01); *H04N 2201/0094* (2013.01)
USPC ......... 358/1.14; 358/1.15; 358/1.16; 358/1.9; 358/1.1; 726/16; 726/17; 726/18; 726/19; 726/21

(58) Field of Classification Search
None
See application file for complete search history.

(56) References Cited

U.S. PATENT DOCUMENTS

| 2005/0100378 | A1* | 5/2005 | Kimura et al. | 400/76 |
| 2006/0092453 | A1* | 5/2006 | Okada et al. | 358/1.14 |
| 2007/0035767 | A1* | 2/2007 | Numata | 358/1.15 |
| 2007/0211287 | A1* | 9/2007 | Fujii | 358/1.16 |
| 2008/0030762 | A1* | 2/2008 | Morita | 358/1.14 |
| 2009/0027722 | A1* | 1/2009 | Tsujimoto | 358/1.15 |
| 2009/0257078 | A1* | 10/2009 | Sawada et al. | 358/1.14 |

FOREIGN PATENT DOCUMENTS

| JP | 2004-320717 A | 11/2004 |
| JP | 2007-101640 A | 4/2007 |
| JP | 2007-228209 A | 9/2007 |

OTHER PUBLICATIONS

Japanese Office Action for corresponding JP 2009-099028. Mail date Jul. 2, 2013.

* cited by examiner

*Primary Examiner* — Hilina K Demeter
(74) *Attorney, Agent, or Firm* — Rossi, Kimms & McDowell LLP

(57) ABSTRACT

An image processing apparatus which is capable of realizing security improvements without degrading the usability. A user is authenticated, and an operation screen accepting an operation input from the user is displayed. A job is executed according to an instruction of the user authenticated by the user authenticating unit. It is determined whether or not the job of which execution is instructed by the user, is being executed when the user authenticating unit authenticates the user. A first operation screen through which the user inputs an instruction for the job in execution is displayed when the job executing unit is executing the job, of which execution is instructed by the user, whereas another operation screen through which another user inputs an instruction for another job is displayed when not.

11 Claims, 10 Drawing Sheets

IMAGE PROCESSING APPARATUS AND METHOD, INCLUDING USER AUTHENTICATION, AND STORAGE MEDIUM

BACKGROUND OF THE INVENTION

1. Field of the Invention

The present invention relates to an image processing apparatus and method, and a storage medium, and more particularly, to an image processing apparatus and method, and a storage medium which become usable by a user through user authentication.

2. Description of the Related Art

In an image processing apparatus which becomes usable by a user through user authentication, which causes the user to execute a login operation for the user authentication when used, and permits the user which has logged in to use it, when a plurality of users log in at the same time, such users alternately execute respective jobs. Then, after the job is completed, each user executes a logout operation by executing an operation such as depressing a logout button for (for example, Japanese Laid-Open Patent Publication (Kokai) No. 2007-228209).

However, a user may sometimes forget to execute a logout operation. Particularly, when a waiting time is long until the job is completed, the user may leave the image processing apparatus after instructing the execution of the job. Thereby, even after the job is completed, the image processing apparatus is left in a logged-in state, and may be used without notice by another user. Furthermore, when a predetermined time elapses and the user has not performed any operation, the logout operation of the image processing apparatus may be forcibly executed, and in this case, the logout operation may be executed while the user is using the image processing apparatus, so that it is difficult to set a time for executing the forcible logout operation.

To resolve the above problem, such a technique exists that an appointment for the logout operation by the user is accepted, and when the appointment for the logout operation is accepted, the logout operation is executed after the job of the user is completed.

However, in the above conventional technique, it is impossible to inhibit another user to instruct an operation for the job or the execution for a new job between a job start and a job end. In the above conventional technique, when the logout operation is forcibly executed before the job ends, the user becomes unable to instruct setting changes or interruption of the job for the job, of which execution is instructed, which degrades the usability.

SUMMARY OF THE INVENTION

The present invention provides an image processing apparatus and method, and a storage medium which can realize security improvements without degrading the usability.

In an aspect of the present invention, there is provided an image processing apparatus, comprising: a user authenticating unit configured to authenticate a user; an operation screen display unit configured to display an operation screen accepting an operation input from the user; a job executing unit configured to execute a job according to an instruction of the user authenticated by the user authenticating unit; a determining unit configured to determine whether or not the job executing unit is executing the job, of which execution is instructed by the user, when the user authenticating unit authenticates the user; and a display control unit configured to control the operation screen display unit so as to display a first operation screen through which the user inputs an instruction for the job in execution when the job executing unit is executing the job, of which execution is instructed by the user, whereas to control the operation screen display unit so as to display another operation screen through which another user inputs an instruction for another job when not.

According to the present invention, it is possible to inhibit another user to instruct an operation for the job, or an execution for a new job between the job start and the job end, and further, even when the logout operation is forcibly executed before the job end, it is possible for the user to instruct setting changes or interruption of the job for the job of which execution is instructed. As a result, according to the present invention, it is possible to provide an image processing apparatus and method, and a storage medium which can realize security improvements without degrading the usability.

Further features and advantages of the present invention will become apparent from the following detailed description of exemplary embodiments with reference to the attached drawings.

DETAILED DESCRIPTION OF THE PREFERRED EMBODIMENTS

The present invention will now be described in detail with reference to the drawings.

Figure 1:
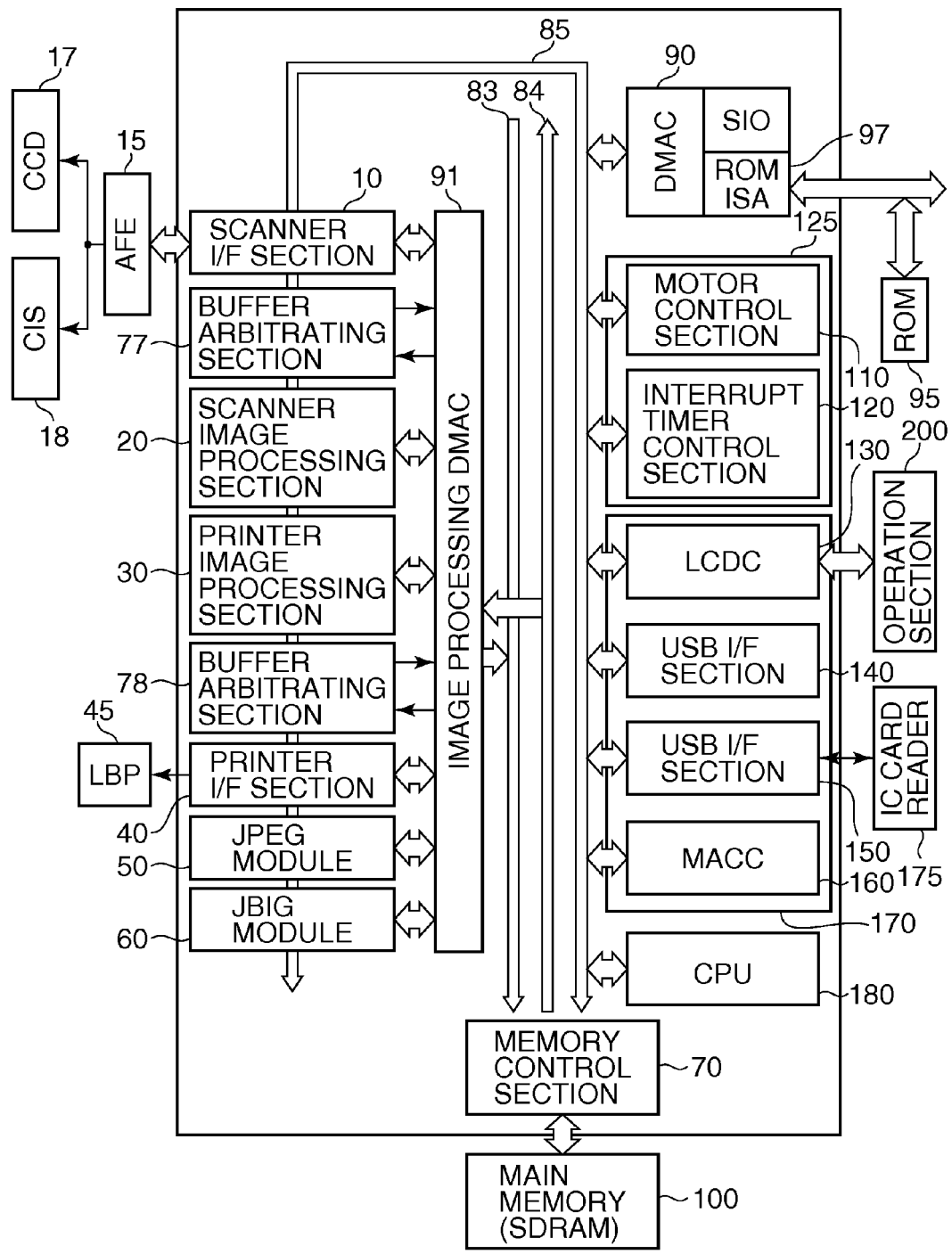
FIG. 1 is a block diagram schematically showing the configuration of an image processing apparatus according to an embodiment of the present invention.

FIG. 1 is a block diagram schematically showing the configuration of an image processing apparatus according to an embodiment of the present invention.

The image processing apparatus of FIG. 1 includes copy, FAX, print and scanner functions, and can be login-managed by an IC card reader. Hereinafter, a configuration thereof will be described with an operation.

In the image processing apparatus of FIG. 1, a CCD 17 and a CIS (Contact Image Sensor) 18 are connected to a scanner interface (scanner I/F) section 10 through an analog front end (AFE) 15, whereby the read data can be taken in the image processing apparatus without using an individual dedicated circuit.

A scanner image processing section 20 executes an image processing according to an image processing operation mode (color copy, monochrome copy, color scan, monochrome scan, and the like) for image data developed in a main memory (SDRAM) 100 by the processing of the scanner I/F section 10.

When transferring data between the scanner I/F section 10 and the scanner image processing section 20 through a ring buffer area on the main memory 100, a buffer arbitrating section 77 arbitrates writing and reading for the data.

A printer image processing section 30 executes area editing and resolution conversion of an inputted image, and outputs the obtained image data to a printer. A printer I/F section 40 outputs an image processing result to a laser beam printer (LBP) 45 connected to the printer I/F section 40.

When transferring data between the printer image processing section 30 and the printer I/F section 40 through the ring buffer area on the main memory 100, a buffer arbitrating section 78 arbitrates writing and reading for the data.

A JPEG module 50 and a JBIG module 60 execute a compressing and expanding process for the image data conforming to predetermined standards, respectively.

A memory control section 70 is connected to each of a first bus 83 and a second bus 84 of an image processing system, and a third bus 85 of a computer system, and executes data transfer control for writing and reading data to and from the main memory 100.

A DMA controller (DMAC) 90 is, in association with the memory control section 70, connected to a ROM 95 through a ROM ISA 97. The DMAC 90 generates and sets predetermined address information for executing DMA control on data transfer between an external device or a user interface control section 170, and the main memory 100.

An image processing DMAC 91 generates and sets, in association with the memory control section 70, predetermined address information for executing the DMA control on data transfer between each image processing section (10, 20, 30, and 40) and the main memory 100.

For example, the DMAC 91 generates the address information for DMA-transferring the image data read and processed by the scanner I/F section 10 to the main memory 100 for each DMA channel according to types of image reading devices (CCD 17 and CIS 18).

The DMAC 91 generates the address information for reading the image data developed on the main memory 100 according to the DMA channel, and DMA-transfers the generated address information to the scanner image processing section 20.

As described above, the DMAC 91 functions as a unit for conducting the DMA control between the image processing sections (10, 20, 30, and 40) and the main memory 100 in association with the memory control section 70.

In the ROM 95 are stored an appropriate control parameter and an appropriate control program data according to types of the image reading devices (CCD 17 and CIS 18), and a variety of the control parameters, and the like can be set according to types of the image reading devices. This makes it possible to input the image data according to individual data output formats of the CCD 17 and CIS 18, thereby eliminating the need for providing a dedicated interface circuit.

The first bus 83 can transfer data read from the main memory 100 to each processing section (10 to 60) of the image processing system. The second bus 84 can transfer data read from each processing section (10 to 60) of the image processing system to the main memory 100. The first bus and the second bus transfer, in pairs, the image data between an image processing block and the main memory 100.

The third bus 85 is directed to a bus of the computer system, to which are connected a CPU 180, the user interface control section 170, a mechatronics system control section 125, control registers in the image processing section, and the DMAC 90.

The mechatronics system control section 125 includes a motor control section 110, and an interrupt timer control section 120 for conducting a driving timing of a motor, and timing control for controlling synchronization of the process of the image processing system.

An LCD control section (LCDC) 130 conducts display control for displaying a variety of settings, processing situations, and the like of the image processing apparatus on an operation section 200. The LCDC 130 has a role for transferring information inputted by a user from the operation section 200 to the CPU 180.

USB I/F sections 140 and 150 enable the connection with peripheral equipment. In FIG. 1, such a state is shown that an IC card reader 175 is connected.

A medium access control section (MACC) 160 is a unit for controlling a timing in which data is to be transferred to the connected equipment, and a timing in which the connected equipment is to be accessed, and the like. The CPU 180 controls a whole operation of the image processing apparatus of FIG. 1.

Figure 2:
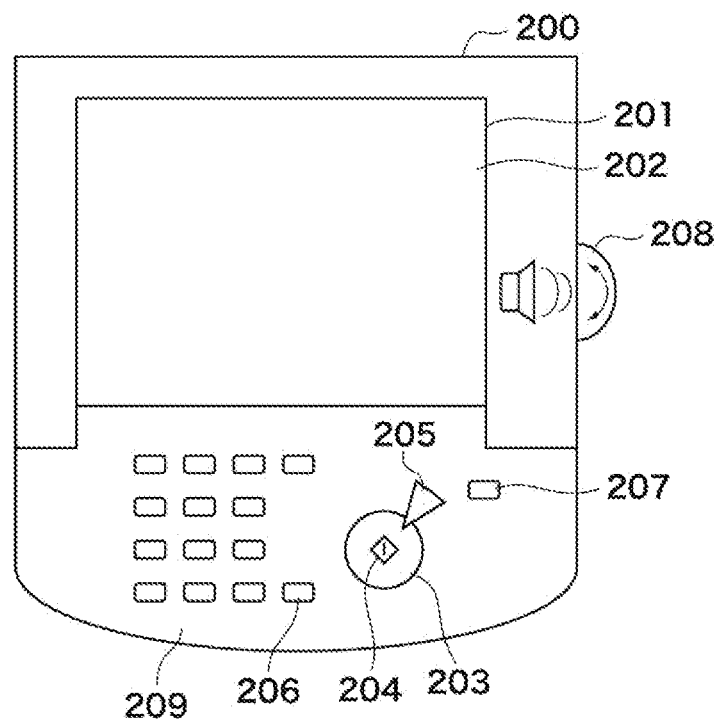
FIG. 2 is a view schematically showing the configuration of an operation part 200 in FIG. 1.

FIG. 2 is a view schematically showing the configuration of the operation part 200 in FIG. 1.

In FIG. 2, a touch panel sheet 202 is put on an LCD of an LCD display section 201, and the LCD display part 201 displays an operation screen and a soft key of the image processing apparatus of FIG. 1, and transmits the depressed soft key to the CPU 180.

A start key 203 is used when a reading operation for a document image is started, and the like. There is a two-color LED 204 of green and red in a center of the start key 203, and the color of the start key 203 indicates whether or not the start key 203 is usable.

A stop key 205 functions to stop an operation in execution. An ID key 206 is used when a user ID of a user is inputted. A reset key 207 is used when the setting by the operation part 200 is initialized.

A volume adjusting dial 208 is used when sound volume is turned up/down. A numeric keypad 209 is used when a numerical character is inputted.

Figure 3:
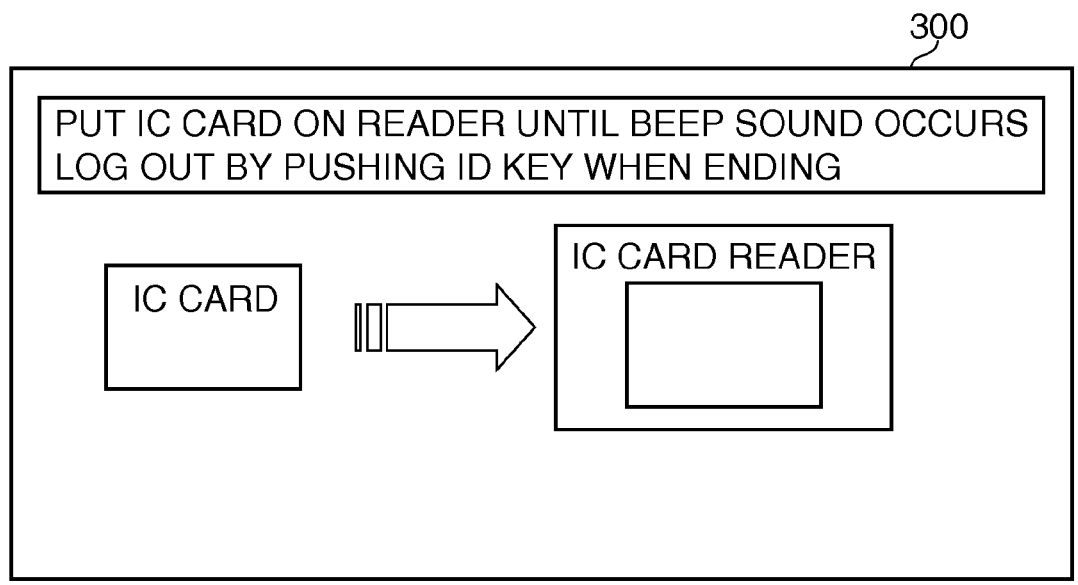
FIG. 3 is a view showing a logout screen displayed on an LCD display part 201 in FIG. 2.

FIG. 3 is a view showing a logout screen displayed on the LCD display part 201 in FIG. 2.

In FIG. 3, a logout screen 300 is directed to a screen displayed on the LCD display part 201 of the operation part 200 in such a state that the user does not log in to the image processing apparatus of FIG. 1 (logout state). The logout screen 300 shows a method for executing a login and a logout.

Figure 4:
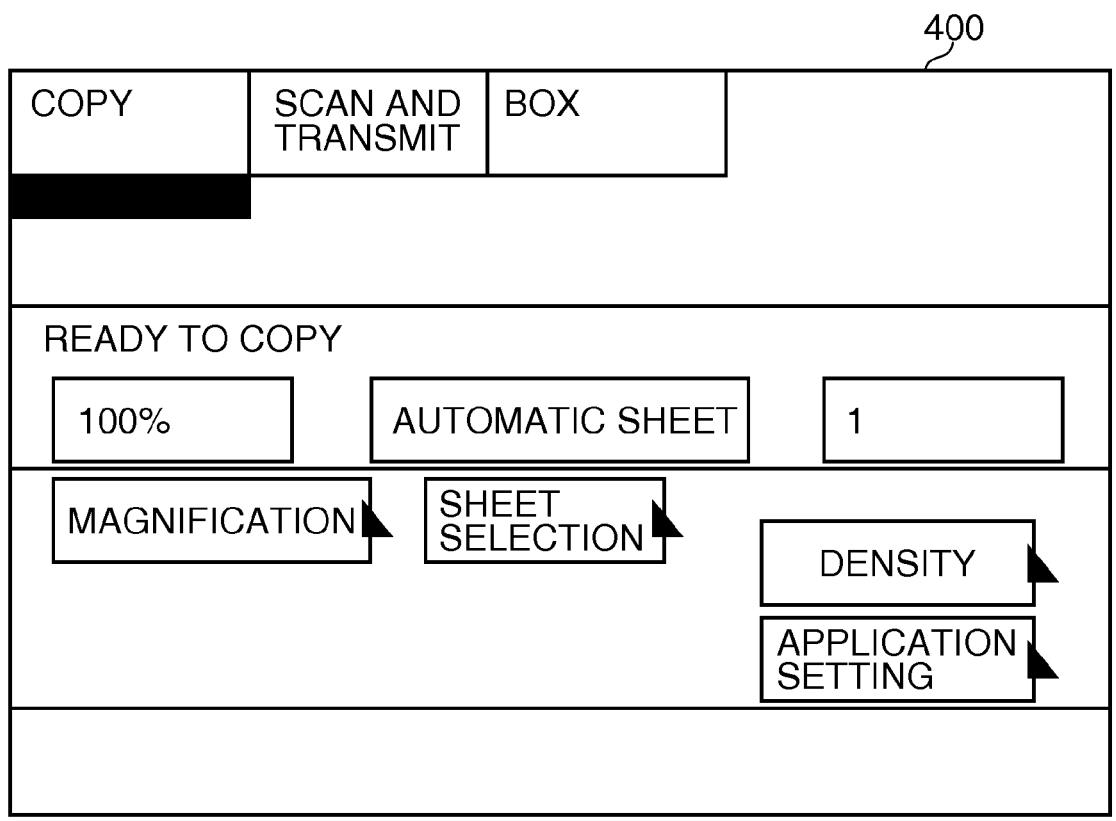
FIG. 4 is a view showing a login initial screen displayed on the LCD display part 201 in FIG. 2.

FIG. 4 is a view showing a login initial screen displayed on the LCD display part 201 in FIG. 2.

In FIG. 4, a login initial screen 400 is a screen displayed on the LCD display part 201 of FIG. 2 after a user logs in to the image processing apparatus of FIG. 1.

The login initial screen 400 displays the setting of a job, and while this screen is being displayed, the user can input a job and change the setting for the image processing apparatus of FIG. 1.

Figure 5:
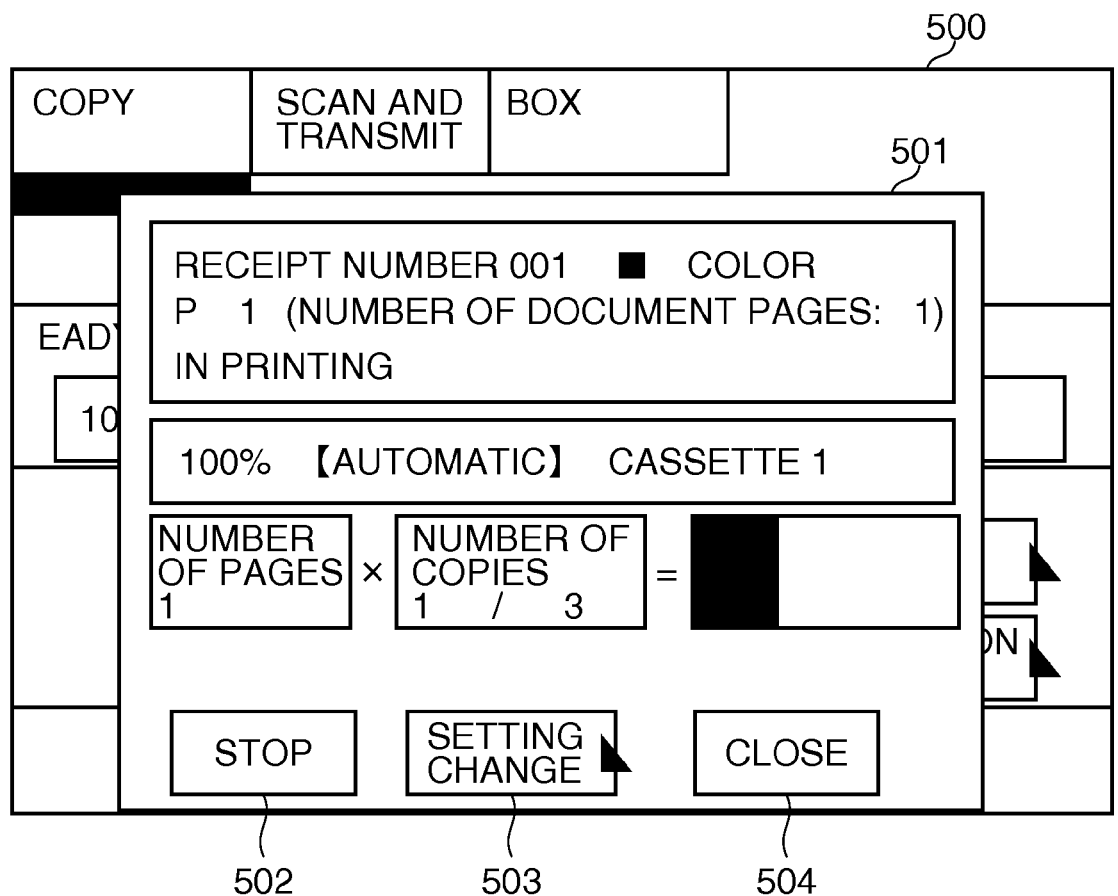
FIG. 5 is a view showing a login in-execution screen displayed on the LCD display part 201 in FIG. 2.

FIG. 5 is a view showing a login in-execution screen displayed on the LCD display part 201 in FIG. 2.

In FIG. 5, a login in-execution screen 500 is a screen displayed after a job is set on the login initial screen 400, and the execution of the job is instructed, and is displayed by the CPU 180 on the LCD display part 201 of the operation part 200. The login in-execution screen 500 displays an in-execution pop-up screen 501 on the login initial screen 400.

In the in-execution pop-up screen 501, the followings are displayed: a situation of the job being executed at the last minute; a stop button 502 for stopping the job in execution; a setting change button 503 for executing setting changes; and a close button 504 for closing the in-execution pop-up screen 501. The operation is enabled by touching each button.

Figure 6:
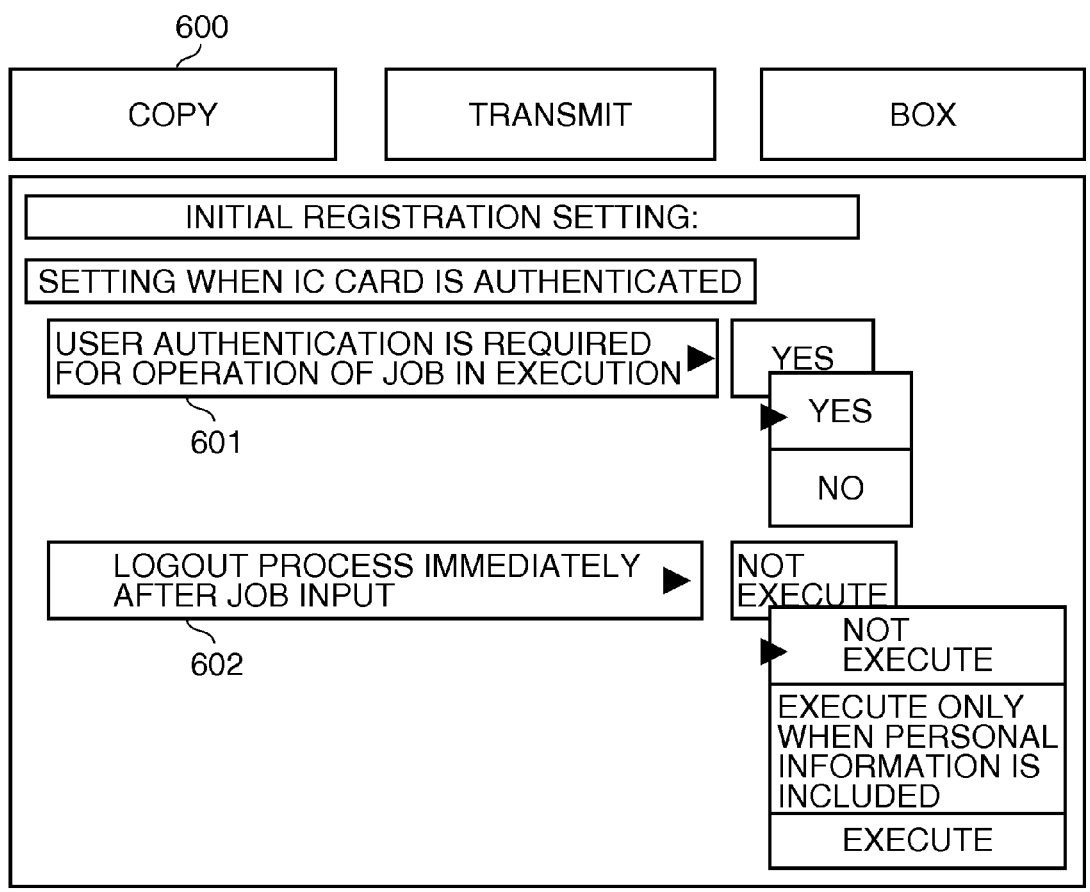
FIG. 6 is a view showing an IC card authentication setting screen displayed on the LCD display part 201 in FIG. 2.

FIG. 6 is a view showing an IC card authentication setting screen displayed on the LCD display part 201 in FIG. 2.

In FIG. 6, a setting item 601 of a setting screen 600 is directed to a setting of whether or not user authentication (utilization permission authentication for the image processing apparatus) is required for an operation for the job in execution. In the setting item 601, for all the jobs of a login user, when user authentication (utilization permission authentication for the image processing apparatus) is required for the operation for the job in execution, "YES" can be set, and when not, "NO" can be set. When "YES" is set, a fact that the same user as the user instructing the job execution is authenticated becomes a condition for enabling the operation for the job in execution. By setting "YES", the user other than the user instructing the job execution becomes unable to operate for the job in execution, and the security for the job execution is improved. The setting item 601 is displayed by the CPU 180, and is utilized by a job operation authentication registering module 704 described hereinafter.

A setting item 602 is directed to a setting for whether or not a logout process is automatically executed after a job is inputted. In the present embodiment, the timing after the job is inputted is directed to a timing (for example, in the case of a copy job, a timing after it is recognized that the start key 203 is pushed) after the image processing apparatus of FIG. 1 accepts a job execution starting instruction by the user.

In the setting item 602, when the logout process is not executed after the job is inputted, "NOT EXECUTE" can be set, when the logout process is executed, "EXECUTE" can be set, and when the logout process is executed only when personal information is displayed, "EXECUTE ONLY WHEN PERSONAL INFORMATION IS INCLUDED" can be set. The setting item 602 is displayed by the CPU 180, and is utilized by a logout setting module 707, described hereinafter, after the job is inputted.

Figure 7:
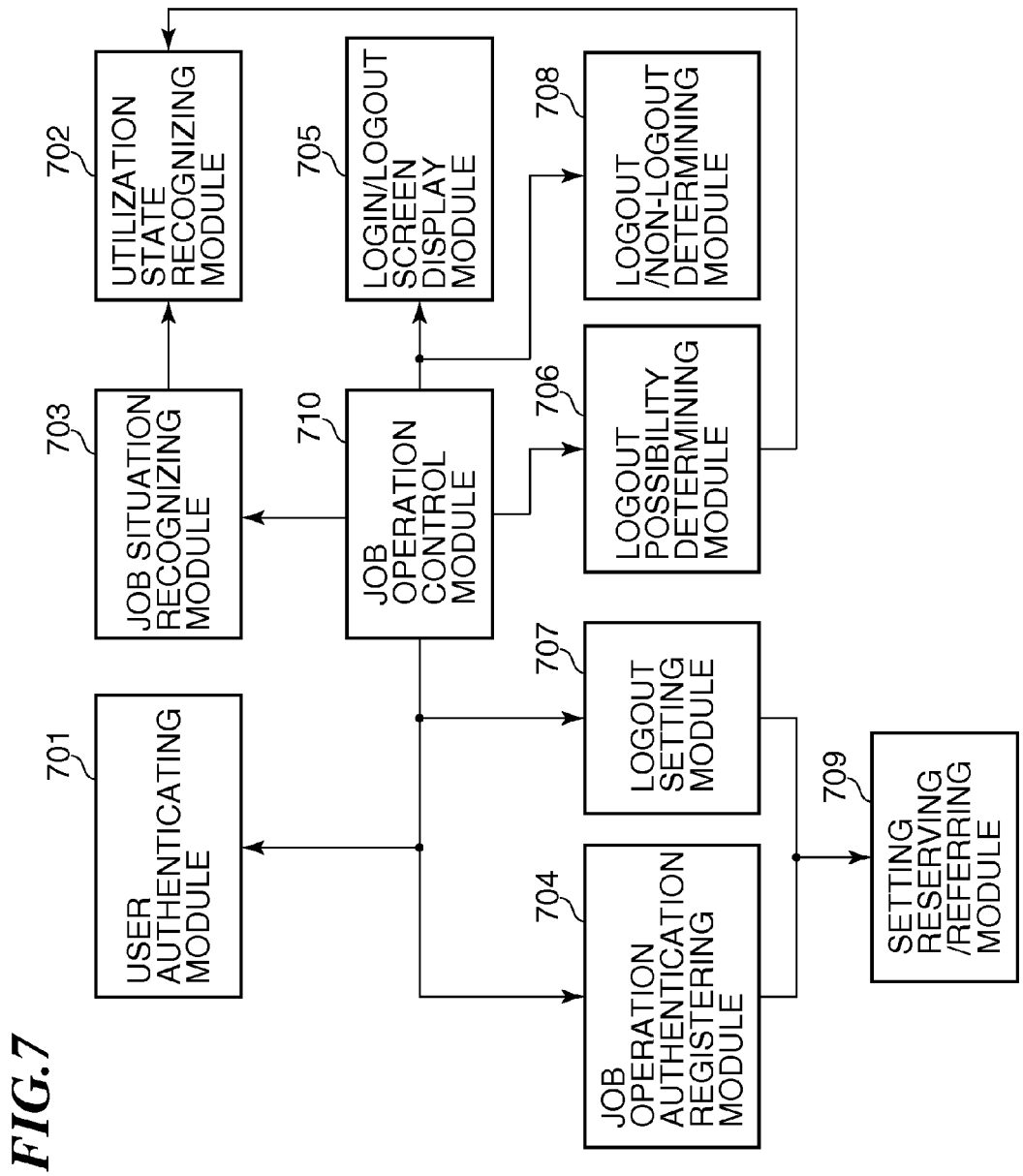
FIG. 7 is a view showing an example of the configuration of software for causing the image processing apparatus of FIG. 1 to execute login management control.

FIG. 7 is a view showing an example of the configuration of software for causing the image processing apparatus of FIG. 1 to execute login management control.

Each of reference numerals 701 to 710 is directed to a software module executed (processed) by the CPU 180 of the image processing apparatus, and is stored in the ROM 95.

A user authenticating module 701 obtains user information from an IC card by the IC card reader 175 of the image processing apparatus of FIG. 1, and executes utilization permission authentication of the image processing apparatus of FIG. 1. The user authentication is directed to a process required when the image processing apparatus of FIG. 1 is subjected to login, when the setting of the job is changed or the job is canceled, or when the job is newly executed.

When the setting of the job is changed or the job is canceled, only when the user, who is the same as the user of the job, of which setting is changed or which is canceled, can be authenticated.

A utilization state recognizing module 702 recognizes the utilization state of the image processing apparatus of FIG. 1 for a removable medium (document, print output material, and removable memory) for the job. The utilization state recognizing module 702 recognizes whether or not reading of all the documents is completed, when the job does not include print output.

When a job includes print output, the utilization state recognizing module 702 recognizes whether or not processing of all the print outputs is completed, and when it is not completed, the utilization state recognizing module 702 determines that the job is in a removable medium utilization non-completion state. When it is completed, the utilization state recognizing module 702 determines that the job is in a removable medium utilization completion state.

A job situation recognizing module 703 recognizes whether or not the job of the user authenticated by the user authenticating module 701 is included. When the job is not included, the job situation recognizing module 703 notifies "absence of job". In a case where the job is included, when the inputted job is in the removable medium utilization non-completion state, the job situation recognizing module 703 notifies "absence of job", whereas when the inputted job is in the removable medium utilization completion condition, the job situation recognizing module 703 notifies "absence of job".

A job operation authentication registering module 704 can register, in the setting item 601 of the setting screen 600 at the time of the IC card authentication, whether or not it is required for the user authenticating module 701 to perform the utilization permission authentication for the operation of the job in execution, of which execution is instructed by the user authenticated by the user authenticating module 701. The registered values can be reserved and be referred to by a setting reserving/referring module 709 described hereinafter.

A login/logout screen display module 705 displays the logout screen 300, the login initial screen 400, and the login in-execution screen 500.

When the utilization state recognizing module 702 recognizes that the inputted job of the user authenticated by the user authenticating module 701 is in the removable medium utilization job non-completion state, a logout possibility determining module 706 determines that the logout is impossible. When the utilization state recognizing module 702 recognizes that the removable medium utilization job is in the removable medium utilization job completion state, the logout possibility determining module 706 determines that the logout is possible. Further, when the login in-execution screen 500 is closed, the logout possibility determining module 706 determines that the logout is possible.

A logout setting module 707 sets whether or not the logout is executed after the job is inputted at the setting item 602 of the setting screen 600 at the time of the IC card authentication. The logout setting module 707 can set "logout process is not executed", and "logout process is executed only when personal information is included".

The above registered value can be reserved and be referred to by the setting reserving/referring module 709 described hereinafter.

After receiving a job start instruction by the user authenticated by the user authenticating module 701, a logout/non-logout determining module 708 determines whether the login in-execution screen 500 is displayed, or the logout screen 300 is displayed.

When the logout setting module 707 sets that the logout process is executed, the logout/non-logout determining module 708 notifies "logout", whereas when not, the logout/non-logout determining module 708 notifies "non-logout". In a case where the personal information is included, when an address and a file name are displayed on the login in-execution screen 500, the logout/non-logout determining module 708 notifies "logout", whereas when not, the logout/non-logout determining module 708 notifies "non-logout".

The setting reserving/referring module 709 reserves the values set by the job operation authentication registering module 704 and the logout setting module 707 in the main memory 100. The set values can be read from the main memory 100.

A job operation control module 710 controls a job operation by utilizing modules including the user authenticating module 701, the job situation recognizing module 703, the job operation authentication registering module 704, the login/logout screen display module 705, the logout possibility determining module 706, the logout setting module 707, and the logout/non-logout determining module 708.

Figure 8:
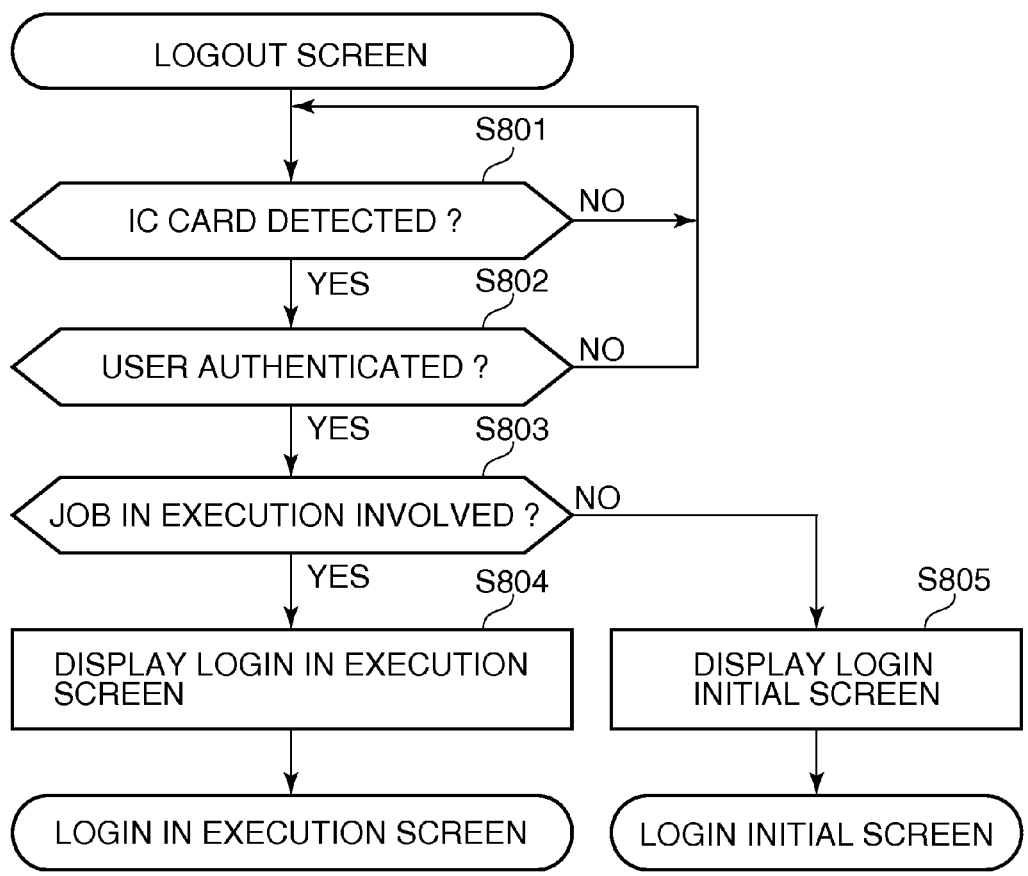
FIG. 8 is a flowchart showing the procedure of a first screen display transition process executed by the image processing apparatus of FIG. 1.

FIG. 8 is a flowchart showing the procedure of a first screen display transition process executed by the image processing apparatus of FIG. 1.

Specifically, the first screen display transition process of FIG. 8 is a process of transitioning from the logout screen 300 to the login in-execution screen display state 500 or a login initial screen 400. This process is executed by the CPU 180 in FIG. 1.

In FIG. 8, while the LCD display part 201 in FIG. 2 displays the logout screen of FIG. 3, it is determined in step S801 whether or not the IC card is detected by the IC card reader 175, and when the IC card is detected, the program proceeds to step S802, in which the user authenticating module 701 executes the user authentication based on the information read from the IC card reader 175.

As a result of the authentication of the step S802, when the user authentication (utilization permission authentication of the image processing apparatus) can be executed (YES to the step S802), the job situation recognizing module 703 determines whether or not the job in execution is included (step S803).

As a result of the determination of the step S803, when the job in execution is included, the login/logout screen display module 705 displays the login in-execution screen 500 of FIG. 5 for the job which is notified to be included in step S803 (step S804), followed by the program proceeding to a process of FIG. 10 described hereinafter.

As a result of the determination of the step S803, when the job in execution is not included (NO to the step S802), the login/logout screen display module 705 displays the login initial screen 400 of FIG. 4 (step S805), followed by the program proceeding to a process of FIG. 9 described hereinafter. Moreover, in step S803, even when a job, of which execution is instructed by the user and which is waiting to be executed, is included, it may be determined that the job in execution is included.

Figure 9:
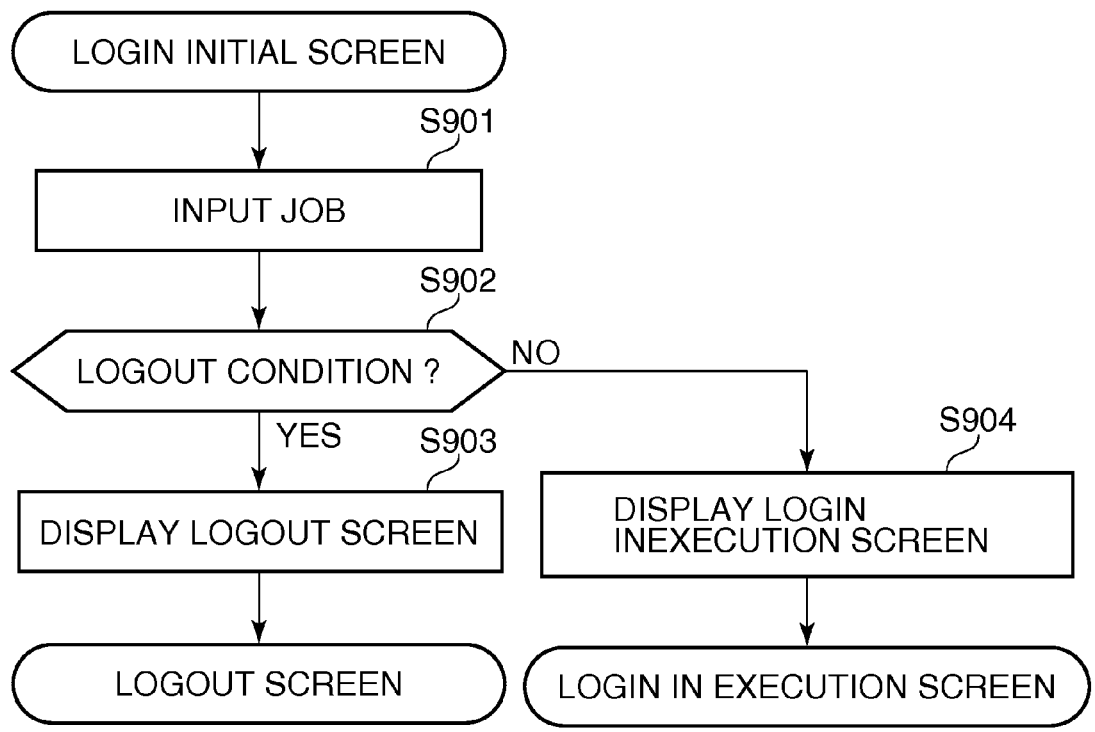
FIG. 9 is a flowchart showing the procedure of a second screen display transition process executed by the image processing apparatus of FIG. 1.

FIG. 9 is a flowchart showing the procedure of a second screen display transition process executed by the image processing apparatus of FIG. 1.

Specifically, the second screen display transition process of FIG. 9 is a process of transitioning from the login initial screen 400 to the logout screen 300 or the login in-execution screen 500. This process is executed by the CPU 180 of FIG. 1.

In FIG. 9, while the login initial screen 400 of FIG. 4 is displayed (step S805 of FIG. 8), when a variety of settings for executing the job are inputted (step S901) and it is recognized that the start key 203 is depressed, the job is executed, followed by the program proceeding to step S902.

In step S902, the logout/non-logout determining module 708 determines "contents of a logout condition after the job is inputted" set by the logout setting module 707.

As a result of the determination of the step S902, when "the logout process is executed after the job is inputted" is set, the login/logout screen display module 705 displays the logout screen 300 of FIG. 3 (step S903), followed by the program terminating. When "the logout process is not executed after the job is inputted" is set, the login/logout screen display module 705 displays the logout in-execution screen 500 of FIG. 5 on the job started in the above step S901 (step S904), followed by the program proceeding to a process of FIG. 10 described hereinafter.

As a result of the determination of the step S902, in a case where "the logout is executed only when the personal information is included" is set, when personal information such as a transmission address and a file name is displayed on the login in-execution screen 500 of FIG. 5, the process of the step S903 is executed, whereas when the personal information is not displayed on the login in-execution screen 500, the process of the step S904 is executed.

Figure 10:
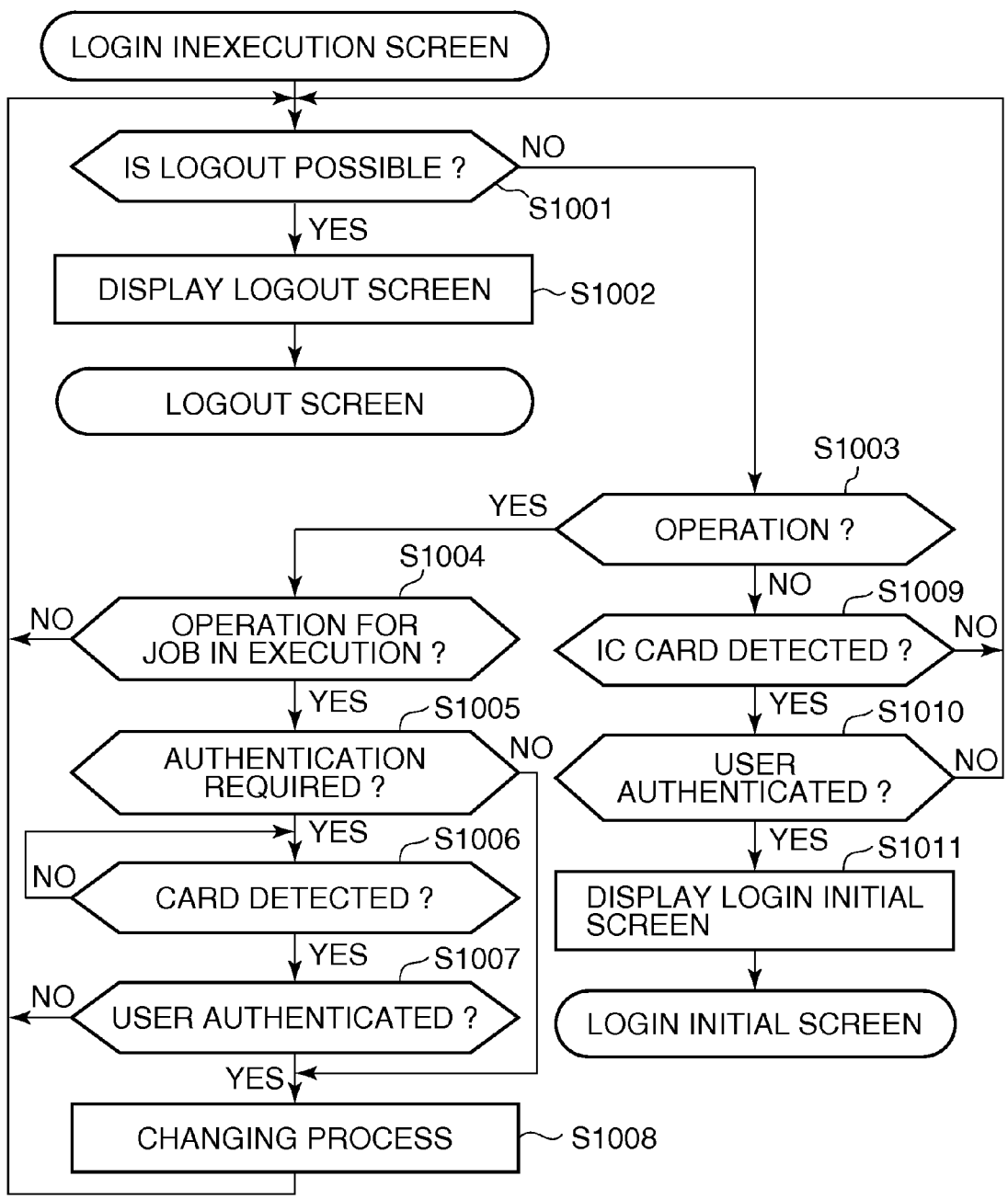
FIG. 10 is a flowchart showing the procedure of a third screen display transition process executed by the image processing apparatus of FIG. 1.

FIG. 10 is a flowchart showing the procedure of a third screen display transition process executed by the image processing apparatus of FIG. 1.

Particularly, the third screen display transition process of FIG. 10 is the process for transitioning from the login in-execution screen 500 to the logout screen 300 or the login initial screen 400. The present process is executed by the CPU 180 of FIG. 1.

In FIG. 10, while the login in-execution screen 500 of FIG. 5 is displayed (step S904 of FIG. 9), the logout possibility determining module 706 determines whether or not the logout is possible (step S1001), when the logout is possible, the program proceeds to step S1002, whereas when the logout is impossible, the program proceeds to step S1003.

The determination of the step S1001 by the logout possibility determining module 706 is executed as follows.

When the utilization state recognizing module 702 recognizes that the job of the user authenticated by the user authenticating module 701 is in the removable medium utilization job non-completion state, the logout possibility determining module 706 determines that the logout is impossible.

When the utilization state recognizing module 702 recognizes that the removable medium utilization job is in the removable medium utilization job completion state, the logout possibility determining module 706 determines that the logout is possible.

In step S1002, the login/logout screen display module 705 displays the logout screen 300 of FIG. 3, followed by program terminating.

In step S1003, it is determined whether or not the operation section 200 accepts operation input by the user for the job in execution, when the operation section 200 accepts the operation input, the job situation recognizing module 703 determines whether or not the accepted operation input is an operation for the job in execution (step S1004). As a result of the determination of the step S1004, when the accepted operation is not the operation for the job in execution, the process returns to step S1001.

As a result of the determination of the step S1004, when the accepted operation is the operation for the job in execution, the job operation authentication registering module 704 determines whether or not the user authentication (utilization permission authentication for the image processing apparatus) is required for the operation for the job in execution (step S1005).

As a result of the determination of the step S1005, when the user authentication (utilization permission authentication for the image processing apparatus) is required, the program proceeds to step S1006, in which the IC card is detected by the IC card reader 175 (YES to the step S1006), and the user authentication (utilization permission authentication for the image processing apparatus) is executed by the user authenticating module 701 based on information read from the IC card reader 175. When it is determined that the user is correctly authenticated (YES to the step S1007), the operation for the job in execution is executed, with execution of a changing process (step S1008), followed by the process returning to step S1001.

As a result of the determination of the step S1003, when the operation part 200 does not accept the operation input by the user for the job in execution, the processes after step S1009 are executed.

In step S1009, the IC card reader 175 determines whether or not the IC card reader 175 detects the IC card. In the image processing apparatus of FIG. 1, a plurality of the users can log in at the same time. Thereby, even when the first user instructs the job execution, but does not execute the logout process yet, the image processing apparatus accepts the login by the second user. In this case, the second user can instruct the execution of the job other than the job in execution.

In step S1010, the user authenticating module 701 determines whether or not the user authentication (utilization permission authentication for the image processing apparatus) can be executed based on information read from the IC card reader 175.

As results of the respective determinations of the steps S1009 and S1010, when the IC card reader 175 detects the IC card (YES to the step S1009), and when the user authenticating module 701 can execute the user authentication (utilization permission authentication for the image processing apparatus) based on information read from the IC card reader 175 (YES to the step S1010), the login/logout screen display module 705 displays the login initial screen 400 of FIG. 4 through which the job is inputted, followed by the program terminating. This screen enables the user newly authenticated in the step S1010 to execute the operation input for instructing the job execution.

It should be noted that the object of the present invention may also be accomplished by executing the following process. That is, the process is executed by supplying the image processing apparatus or an information processing apparatus, or a function expansion unit of the apparatuses with a storage medium for storing a program code (hereinafter referred to as "the control program") of software of realizing the functions of the above described embodiment, and causing a computer (CPU or MPU) of each of the apparatuses to read the control program stored in the storage medium. In this case, the control program itself read from the storage medium realizes the functions of the above described embodiment, and hence the control program and the storage medium storing the control program configure the present invention. The control program may be downloaded through a network.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2009-099028, filed Apr. 15, 2009, which is hereby incorporated by reference herein in its entirety.

What is claimed is:

1. An image processing apparatus, comprising:
    a login processing unit configured to enable a user to log in to the image processing apparatus;
    a logout processing unit configured to enable the user to log out of the image processing apparatus;
    an execution unit configured to execute a job based on an instruction given by the user, wherein the execution unit continues to execute the job even after the user has logged out of the image processing apparatus during the execution of the job; and
    a display control unit configured, in a case where a login user who logs in to the image forming apparatus during the execution of the job is identical with a user who has given an instruction to execute the job, to display a first operation screen through which the login user inputs an instruction for stopping the job in execution or an instruction for changing a setting of the job in execution, and the display control unit being configured, in a case where the login user is not identical with a user who has given an instruction to execute the job in execution, to display a predetermined operation screen.

2. The image processing apparatus according to claim 1, wherein further comprising:
    a setting unit configured to set whether or not authentication of the user is required on the first operation screen; and
    an accepting unit accepts, in a case where said setting unit sets as that the authentication of the user is required, when said login processing unit authenticates the user inputting the instruction for the job in execution, the instruction by the authenticated user for the job in execution.

3. The image processing apparatus according to claim 2, wherein said setting unit further sets whether or not a logout process is executed after the user authenticated by said login processing unit has instructed a start for the execution of the job to be started, wherein
    in a case where said another setting section sets that the logout process is executed after the user authenticated by said user authenticating unit has instructed the execution of the job to be started, when said accepting unit accepts the operation input from the user, after the logout process has been completed, said display control unit controls said operation screen display unit so as to display the operation screen for authenticating another user.

4. The image processing apparatus according to claim 3, wherein when said display control unit displays personal information immediately after the user has instructed the execution of the job to be started, said another setting section is configured such that the logout process is automatically executed after the user has instructed the execution for the job to be started.

5. The image processing apparatus according to claim 1, wherein the predetermined operation screen is a login initial screen.

6. The image processing apparatus according to claim 1, wherein the predetermined operation screen is a COPY screen.

7. The image processing apparatus according to claim 1, wherein the first operation screen comprises a screen that displays identification information of identifying the first job at least continuing to be executed.

8. The image processing apparatus according to claim 1, wherein the first operation screen comprises a screen that displays status information of the first job at least continuing to be executed.

9. An image processing method, comprising the steps of:
    enabling a user to log in to an image processing apparatus;
    enabling the user to log out of the image processing apparatus;

executing a job based on an instruction given by the user, wherein the job continues to be executed even after the user has logged out of the image processing apparatus; and controlling, in a case where a login user who logs in to the image forming apparatus during the execution of the job is identical with a user who has given an instruction to execute the job, to display a first operation screen through which the first user inputs an instruction for stopping the job in execution or an instruction for changing a setting of the job in execution, and controlling, in a case where the login user is not identical with a user who has given an instruction to execute the job in execution, to display a predetermined operation screen.

10. A non-transitory computer-readable storage medium that stores a program causing a computer to execute an image processing method, the image processing method comprising the steps of:

enabling a user to log in to an image processing apparatus;
enabling the user to log out of the image processing apparatus;
executing a job based on an instruction given by the user, wherein the job continues to be executed even after the user has logged out of the image processing apparatus; and
controlling, in a case where a login user who logs in to the image forming apparatus during the execution of the job is identical with a user who has given an instruction to execute the job, to display a first operation screen through which the first user inputs an instruction for stopping the job in execution or an instruction for changing a setting of the job in execution, and controlling, in a case where the login user is not identical with a user who has given an instruction to execute the job in execution, to display a predetermined operation screen.

11. An image processing apparatus, comprising:
a login processing unit configured to enable a user to log in to the image processing apparatus;
a logout processing unit configured to enable the user to log out of the image processing apparatus;
an execution unit configured to execute a job based on an instruction given by the user, wherein the execution unit continues to execute the job even after the user has logged out of the image processing apparatus during the execution of the job; and
a display control unit configured, in a case where a login user who logs in to the image forming apparatus during the execution of the job is identical with a user who has given an instruction to execute the job, to display a first operation screen that displays status information of the first job at least continuing to be executed, and the display control unit being configured, in a case where the login user is not identical with a user who has given an instruction the first job, to display a predetermined operation screen.

* * * * *